(12) United States Patent
Harnesk

(10) Patent No.: US 12,085,923 B2
(45) Date of Patent: Sep. 10, 2024

(54) IDENTIFYING AND MANAGING EQUIPMENT WITHIN AN OPERATIONAL ENVIRONMENT

(71) Applicant: PACKSIZE LLC, Salt Lake City, UT (US)

(72) Inventor: Andreas Harnesk, Sundbyberg (SE)

(73) Assignee: PACKSIZE LLC, Salt Lake City, UT (US)

( * ) Notice: Subject to any disclaimer, the term of this patent is extended or adjusted under 35 U.S.C. 154(b) by 0 days.

(21) Appl. No.: 17/374,774

(22) Filed: Jul. 13, 2021

(65) Prior Publication Data

US 2021/0341909 A1 Nov. 4, 2021

Related U.S. Application Data

(63) Continuation of application No. 15/825,461, filed on Nov. 29, 2017, now Pat. No. 11,092,946.

(Continued)

(51) Int. Cl.
G06Q 10/063 (2023.01)
G05B 19/418 (2006.01)
G06Q 10/08 (2023.01)

(52) U.S. Cl.
CPC . *G05B 19/41865* (2013.01); *G05B 19/41805* (2013.01); *G05B 19/4183* (2013.01);
(Continued)

(58) Field of Classification Search
USPC .................................................. 700/99, 100
See application file for complete search history.

(56) References Cited

U.S. PATENT DOCUMENTS 3,280,531 A 10/1966 Meyer-Jagenberg
3,776,419 A 12/1973 Zinkgraf et al.
(Continued)

FOREIGN PATENT DOCUMENTS

CN 1484781 A 3/2004
CN 101719235 A 6/2010
(Continued)

OTHER PUBLICATIONS

Colson et al., U.S. Appl. No. 62/341,073, filed May 25, 2016, 28 Pgs. (Year: 2016).*
(Continued)

*Primary Examiner* — Emilio J Saavedra
(74) *Attorney, Agent, or Firm* — Quarles & Brady LLP

(57) ABSTRACT

Embodiments are directed to apparatuses and methods for managing and producing equipment within an operational environment. In one scenario, a method is performed that includes generating an organizational database structure that maintains information associated with equipment that is part of an operational environment. The organizational database structure includes information indicating which packable items are associated with the piece of equipment. The method further includes accessing the generated organizational database structure to identify physical operational environment factors that affect which pieces of equipment are to be currently produced within the operational environment. The method then evaluates the identified physical operational environment factors to determine whether the specified piece of equipment is to be currently produced within the operational environment and, upon determining that the specified piece of equipment is to be currently processed within the operational environment, the specified piece of equipment is produced and provided to the operational environment.

20 Claims, 5 Drawing Sheets

Related U.S. Application Data

(60) Provisional application No. 62/428,853, filed on Dec. 1, 2016.

(52) U.S. Cl.
CPC ....... *G05B 19/4188* (2013.01); *G06Q 10/063* (2013.01); *G06Q 10/08* (2013.01); *G05B 2219/31001* (2013.01); *G05B 2219/31309* (2013.01)

(56) References Cited

U.S. PATENT DOCUMENTS

| | | |
|---|---|---|
| 3,844,422 A | 10/1974 | Tull et al. |
| 4,149,747 A | 4/1979 | Portz et al. |
| 4,501,106 A | 2/1985 | Treiber et al. |
| 4,551,810 A | 11/1985 | Levine |
| 4,725,961 A | 2/1988 | Pearl |
| 4,929,226 A | 5/1990 | Focke et al. |
| 5,069,016 A | 12/1991 | Grossi |
| 5,299,688 A | 4/1994 | McKay et al. |
| 5,755,349 A | 5/1998 | Brundle |
| 6,119,434 A | 9/2000 | Andersson |
| 6,185,912 B1 | 2/2001 | Artois et al. |
| 6,358,191 B1 | 3/2002 | Greever |
| 6,690,990 B1 | 2/2004 | Caron et al. |
| 6,721,762 B1 | 4/2004 | Levine et al. |
| 6,834,480 B1 | 12/2004 | Ishino et al. |
| 6,876,958 B1 | 4/2005 | Chowdhury et al. |
| 6,980,934 B1 | 12/2005 | Sadovnik |
| 7,055,350 B2 | 6/2006 | Bonnain et al. |
| 7,100,811 B2 | 9/2006 | Pettersson et al. |
| 7,299,103 B1 | 11/2007 | Dye |
| 7,623,943 B2 | 11/2009 | Huber-Buschbeck et al. |
| 7,647,752 B2 | 1/2010 | Magnell |
| 8,086,344 B1* | 12/2011 | Mishra ................. G06Q 10/087 700/214 |
| 8,160,992 B2 | 4/2012 | Gombert et al. |
| 8,234,008 B2 | 7/2012 | Weber |
| 8,527,936 B2 | 9/2013 | Jain et al. |
| 8,560,461 B1 | 10/2013 | Tian et al. |
| 8,682,473 B1* | 3/2014 | Ramey ................. G06Q 10/087 705/29 |
| 9,317,626 B2 | 4/2016 | Chan |
| 9,840,347 B1 | 12/2017 | Linnell et al. |
| 2002/0072824 A1 | 6/2002 | Susnjara |
| 2002/0143669 A1 | 10/2002 | Scheer |
| 2002/0165623 A1 | 11/2002 | Haller et al. |
| 2002/0165639 A1 | 11/2002 | England et al. |
| 2003/0019930 A1 | 1/2003 | Hecht |
| 2003/0037646 A1 | 2/2003 | Ito et al. |
| 2003/0200111 A1 | 10/2003 | Damji |
| 2004/0158507 A1 | 8/2004 | Meek et al. |
| 2005/0044171 A1 | 2/2005 | Bechtel et al. |
| 2005/0065830 A1 | 3/2005 | Duke et al. |
| 2005/0103923 A1 | 5/2005 | Pettersson et al. |
| 2005/0114193 A1 | 5/2005 | Kroening |
| 2005/0238465 A1 | 10/2005 | Razumov |
| 2005/0252396 A1 | 11/2005 | Hartka et al. |
| 2006/0074524 A1 | 4/2006 | Chirnomas |
| 2006/0151604 A1 | 7/2006 | Zhu et al. |
| 2006/0208885 A1 | 9/2006 | Lin |
| 2006/0229927 A1 | 10/2006 | Humphries et al. |
| 2007/0143134 A1 | 6/2007 | Eller et al. |
| 2008/0020916 A1 | 1/2008 | Magnell |
| 2008/0081753 A1 | 4/2008 | Abrott |
| 2008/0221728 A1 | 9/2008 | Inui |
| 2008/0269035 A1 | 10/2008 | Ballestrazzi et al. |
| 2009/0132319 A1 | 5/2009 | Saeed et al. |
| 2009/0173780 A1 | 7/2009 | Ramamoorthy et al. |
| 2009/0223782 A1 | 9/2009 | Martin et al. |
| 2009/0282782 A1 | 11/2009 | Walker et al. |
| 2009/0287632 A1* | 11/2009 | Gombert ................. G06N 5/02 706/55 |
| 2009/0287717 A1 | 11/2009 | Gombert et al. |
| 2010/0070073 A1 | 3/2010 | Foley et al. |
| 2010/0223883 A1 | 9/2010 | Rutschmann |
| 2010/0234983 A1 | 9/2010 | Gesuita et al. |
| 2010/0249988 A1 | 9/2010 | Baldes et al. |
| 2010/0287879 A1 | 11/2010 | Donati et al. |
| 2011/0319242 A1 | 12/2011 | Pettersson |
| 2012/0144334 A1 | 6/2012 | Reichert |
| 2012/0155972 A1 | 6/2012 | Gauthier et al. |
| 2012/0159145 A1 | 6/2012 | Cheong et al. |
| 2012/0160905 A1 | 6/2012 | Wilkum et al. |
| 2013/0000252 A1 | 1/2013 | Pettersson et al. |
| 2013/0017940 A1 | 1/2013 | Bonariva |
| 2013/0027561 A1 | 1/2013 | Lee et al. |
| 2013/0070285 A1 | 3/2013 | Gross et al. |
| 2013/0096735 A1 | 4/2013 | Byford et al. |
| 2013/0204419 A1 | 8/2013 | Pettersson |
| 2013/0211977 A1 | 8/2013 | Lyon et al. |
| 2013/0247519 A1* | 9/2013 | Clark ................. B65B 57/00 53/452 |
| 2014/0038802 A1 | 2/2014 | Clark et al. |
| 2014/0058971 A1 | 2/2014 | Muppirala et al. |
| 2014/0067104 A1* | 3/2014 | Osterhout ............. G06Q 50/28 703/1 |
| 2014/0135966 A1* | 5/2014 | Pettersson ............ G06Q 10/043 700/100 |
| 2014/0351101 A1 | 11/2014 | Danelski |
| 2015/0019282 A1 | 1/2015 | Kozak |
| 2015/0081088 A1 | 3/2015 | Lyon et al. |
| 2015/0307278 A1* | 10/2015 | Wickham ............. G05B 13/041 700/216 |
| 2015/0332213 A1 | 11/2015 | Galluzzo et al. |
| 2015/0363716 A1 | 12/2015 | Harnesk et al. |
| 2016/0167880 A1 | 6/2016 | Pankratov et al. |
| 2016/0239775 A1 | 8/2016 | Featherstone et al. |
| 2016/0283953 A1 | 9/2016 | Ettl et al. |
| 2017/0066592 A1 | 3/2017 | Bastian et al. |
| 2017/0200117 A1* | 7/2017 | High ................... G06F 3/1423 |
| 2017/0270466 A1* | 9/2017 | Kao ................... G05D 1/0217 |
| 2017/0341795 A1* | 11/2017 | Colson ................. B33Y 10/00 |
| 2018/0157245 A1 | 6/2018 | Harnesk |
| 2020/0039747 A1* | 2/2020 | Ahmann ................. G06Q 10/08 |
| 2020/0082308 A1 | 3/2020 | Harnesk et al. |
| 2021/0089984 A1 | 3/2021 | Harnesk et al. |

FOREIGN PATENT DOCUMENTS

| | | |
|---|---|---|
| CN | 102521711 A | 6/2012 |
| EP | 0312877 A2 | 4/1989 |
| EP | 0999040 A1 | 5/2000 |
| EP | 2393743 A1 | 12/2011 |
| IN | 324788 | 4/2012 |
| IN | 329470 | 4/2012 |
| JP | 01-136732 A | 5/1989 |
| JP | 05-257947 A | 10/1993 |
| JP | 07-244688 A | 9/1995 |
| JP | 2000-052192 A | 2/2000 |
| JP | 2000-135696 A | 5/2000 |
| JP | 2002-145219 A | 5/2002 |
| JP | 2004-287623 A | 10/2004 |
| JP | 2006-248575 A | 9/2006 |
| JP | 2009-116780 A | 5/2009 |
| JP | 2009-139979 A | 6/2009 |
| JP | 2009-282914 A | 12/2009 |
| JP | 2010-201909 A | 9/2010 |
| JP | 2011-037568 A | 2/2011 |
| JP | 2012-162376 A | 8/2012 |
| JP | 2014-529115 A | 10/2014 |
| JP | 2016-532608 A | 10/2016 |
| RU | 75372 U1 | 8/2008 |
| RU | 91933 U1 | 3/2010 |
| RU | 2010132245 A | 2/2012 |
| RU | 2455208 C2 | 7/2012 |
| WO | 2010/091043 A1 | 8/2010 |
| WO | 2011/072253 A1 | 6/2011 |
| WO | 2011/085175 A2 | 7/2011 |
| WO | 2012/006050 A1 | 1/2012 |
| WO | 2012/018859 A1 | 2/2012 |
| WO | 2013/016176 A1 | 1/2013 |

(56) References Cited

FOREIGN PATENT DOCUMENTS

| WO | 2014/113719 A1 | 7/2014 |
| WO | 2015/020879 A1 | 2/2015 |
| WO | 2016/014917 A1 | 1/2016 |
| WO | 2016/053747 A1 | 4/2016 |

OTHER PUBLICATIONS

International Search Report and Written Opinion received for PCT Patent Application No. PCT/US2017/063988, mailed on Feb. 16, 2018, 6 pages.
Non-Final Office Action received for U.S. Appl. No. 15/825,461, mailed on Sep. 4, 2020, 36 pages.
"A mini-line appraoch for pull production", Ahmadi et al., European Journal of Operational Research, 125, 2000, pp. 340-358.
"A Part-machine Assignment Algorithm for Cellular Manufacturing with Machine Capacity Constraints" Moussa et al., Computers Ind. Engng., 1998, vol. 35, Nos. 3-4, pp. 483-486.
"An ideal seed non-hierarchical clustering algorithm for cellular manufacturing" MP Chandrasekharan . . . —International Journal of . . . , 1986—Taylor & Francis.
"Design for set manufacturability" RH Ahmadi, H Wurgaft—Management of Design, 1994—Springer.
"Design of order picking system", F Dallari, G Marchet, M Melacini—The international journal of advanced . . . 2009—Springer (Year: 2009).
"Grouping and selecting products: the design key of reconfigurable manufacturing systems (RMSs)" MR Abdi, AW Labib—International journal of production research, 2004—Taylor & Francis.
"Implementing a New Corrugated Packaging Machine in a Mid Sized Manufacturing Company" Wolfe Parzyck, May 2011, Master's Thesis—University of Wisconsin—Stout (Year: 2011).
"Management of Design: Engineering and Management Perspectives" Dasu, Sriram, Eastman, Charles M., 1992, U.C.L.A. Los Angeles, CA, pp. i-277.
"Reactive GRASP for the strip-packing problem", R Alvarez-Valdes, F Parreno, JM Tamarit—Computers & Operations 2008—Elsevier (Year: 2008).
A linear programming approach to the cutting-stock problem PC Gilmore, RE Gomory—Operations research, 1961—pubsonline.informs.org (Year: 1961).
A typology of cutting and packing problems H Dyckhoff—European Journal of Operational Research, 1990—Elsevier (Year: 1990).
An approach to order picking optimization in warehouses M Horvat—2012—core.ac.uk (as an electronic document, this is available from https://core.ac.uk/download/pdf/151477049.pdf (Year: 2012).
Design and control of warehouse order picking: A literature review R De Koster, T Le-Duc, KJ Roodbergen—European journal of operational . . . 2007—Elsevier (Year: 2007).
Final Office Action received for U.S. Appl. No. 14/761,081, mailed on Sep. 4, 2018.
Final Office Action received for U.S. Appl. No. 15/135,059, mailed on Jul. 5, 2019.
Final Office Action received for U.S. Appl. No. 16/681,594, mailed on Oct. 15, 2021, 27 pages.
Freezing the master production schedule under single resource constraint and demand uncertainty J Xie, X Zhao, TS Lee—International Journal of Production Economics, 2003—Elsevier. (Year: 2003).
Hao Zhang et al: DoraPicker: An Autonomous Picking System for general objects, Cornell University Library, 201 Olin Library Co (Mar. 21, 2016).
International Search Report and Written Opinion for PCT/US2014/012124 dated Jun. 18, 2014.
International Search Report and Written Opinion for PCT/US2016/029476 dated Jul. 27, 2016.
International Search Report and Written Opinion, PCT/US2012/047562, US International Search Authority, Date Completed Sep. 25, 2012, Date Mailed Oct. 25, 2012.
Knowledge based approach to the cutting stock problem Y Lirov—Mathematical and computer modelling, 1992—Elsevier (Year: 1992).
Management of Design—Engineering and Management Perspectives, (Copyrights) 1994, Dasu, Sriram; Eastman, Charles, Ed., pp.i-277.
Multi-period planning and uncertainty issues in cellular manufacturing: A review and future directions J Balakrishnan, CH Cheng—European Journal of Operational Research, 2007—Elsevier.
Multistage cutting stock problems of two and more dimensions PC Gilmore, RE Gomory—Operations research, 1965—pubsonline.informs.org (Year: 1965).
Non-Final Office Action received for U.S. Appl. No. 16/681,594, mailed on Jun. 15, 2021, 26 pages.
Non-Final Office Action received for U.S. Appl. No. 16/681,594, mailed on May 17, 2022, 22 pages.
Non-Final Office Action received for U.S. Appl. No. 17/110,075, mailed on Apr. 20, 2022, 29 pages.
Notice of Allowance Mailed on Aug. 14, 2019 for U.S. Appl. No. 14/761,081.
Notice of Allowance Mailed on Jan. 13, 2021 for U.S. Appl. No. 15/135,059.
Office Action received for U.S. Appl. No. 14/158,731, mailed on Sep. 30, 2016.
Office Action received for U.S. Appl. No. 14/761,081, mailed on Mar. 5, 2019.
Office Action received for U.S. Appl. No. 14/761,081, mailed on Mar. 9, 2018.
Office Action received for U.S. Appl. No. 15/135,059, mailed on Apr. 15, 2020.
Office Action received for U.S. Appl. No. 15/135,059, mailed on Dec. 6, 2018.
Research on warehouse design and performance evaluation: A comprehensive review J Gu, M Goetschalckx, LF McGinnis—European Journal of Operational . . . ,2010—Elsevier (Year: 2010).
The Max-Min Ant System applied to the rectangular pieces layout optimization R Liu, H Xu, M Zhang—2012 International Conference on . . . 2012—ieeexplore.ieee.org (Year: 2012).
Final Office Action received for U.S. Appl. No. 16/681,594, mailed on Oct. 20, 2022, 11 pages.
Final Office Action received for U.S. Appl. No. 17/110,075, mailed on Oct. 18, 2022, 24 pages.
Kimura Nobutaka et al: "Mobile dual-arm robot for automated order picking system in warehouse containing various kinds of products", 2015 IEEE/SICE International Symposium on System Integration (Sli), IEEE, Dec. 11, 2015 (Dec. 11, 2015), pp. 332-338.
Non-Final Office Action received for U.S. Appl. No. 16/681,594, mailed on Apr. 3, 2023, 12 pages.
Non-Final Office Action received for U.S. Appl. No. 17/110,075, mailed on Apr. 7, 2023, 9 pages.

* cited by examiner

IDENTIFYING AND MANAGING EQUIPMENT WITHIN AN OPERATIONAL ENVIRONMENT

CROSS-REFERENCE TO RELATED APPLICATIONS

This application is a continuation of U.S. patent application Ser. No. 15/825,461, entitled "IDENTIFYING AND MANAGING EQUIPMENT WITHIN AN OPERATIONAL ENVIRONMENT," filed on Nov. 29, 2017, which application claims priority to and the benefit of U.S. Provisional Patent Application No. 62/428,853, entitled "Identifying and Managing Equipment within an Operational Environment," filed on Dec. 1, 2016. Each of the above referenced applications are expressly incorporated herein by reference in their entirety.

BACKGROUND

Computing systems have become ubiquitous, ranging from small embedded devices to phones and tablets to PCs and backend servers. Each of these computing systems is designed to process software code. The software allows users to perform functions, interacting with the hardware provided by the computing system. In some cases, these computing systems may be equipped with communication components such as wireless radios or wired network controllers. These communication components allow the computing systems to transmit and receive communications from other computing systems, as well as other devices. In some cases, the communication components allow the computing system to receive feedback data from devices or other systems.

BRIEF SUMMARY

Embodiments described herein are directed to apparatuses and methods for managing and producing equipment within an operational environment. In one embodiment, a method is performed that includes generating an organizational database structure that maintains information associated with equipment that is part of an operational environment. The organizational database structure includes information indicating which packable items are associated with the piece of equipment. The method further includes accessing the generated organizational database structure to identify physical operational environment factors that affect which pieces of equipment are to be currently produced within the operational environment. The method then evaluates the identified physical operational environment factors to determine whether the specified piece of equipment is to be currently produced within the operational environment and, upon determining that the specified piece of equipment is to be currently processed within the operational environment, the specified piece of equipment is produced and provided to the operational environment.

In another embodiment, an apparatus for producing equipment is provided. The apparatus includes a processor and an induction system configured to determine an order in which pieces of equipment are produced and then produce the pieces of equipment by performing the following: generating an organizational database structure that maintains information indicating which products are associated with a piece of equipment, accessing the generated organizational database structure to identify physical operational environment factors that affect which pieces of equipment are to be currently produced, evaluating the identified physical operational environment factors to determine whether a specified piece of equipment is to be currently produced by the induction system and, based on the evaluation, producing the specified piece of equipment for placement within an operational environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
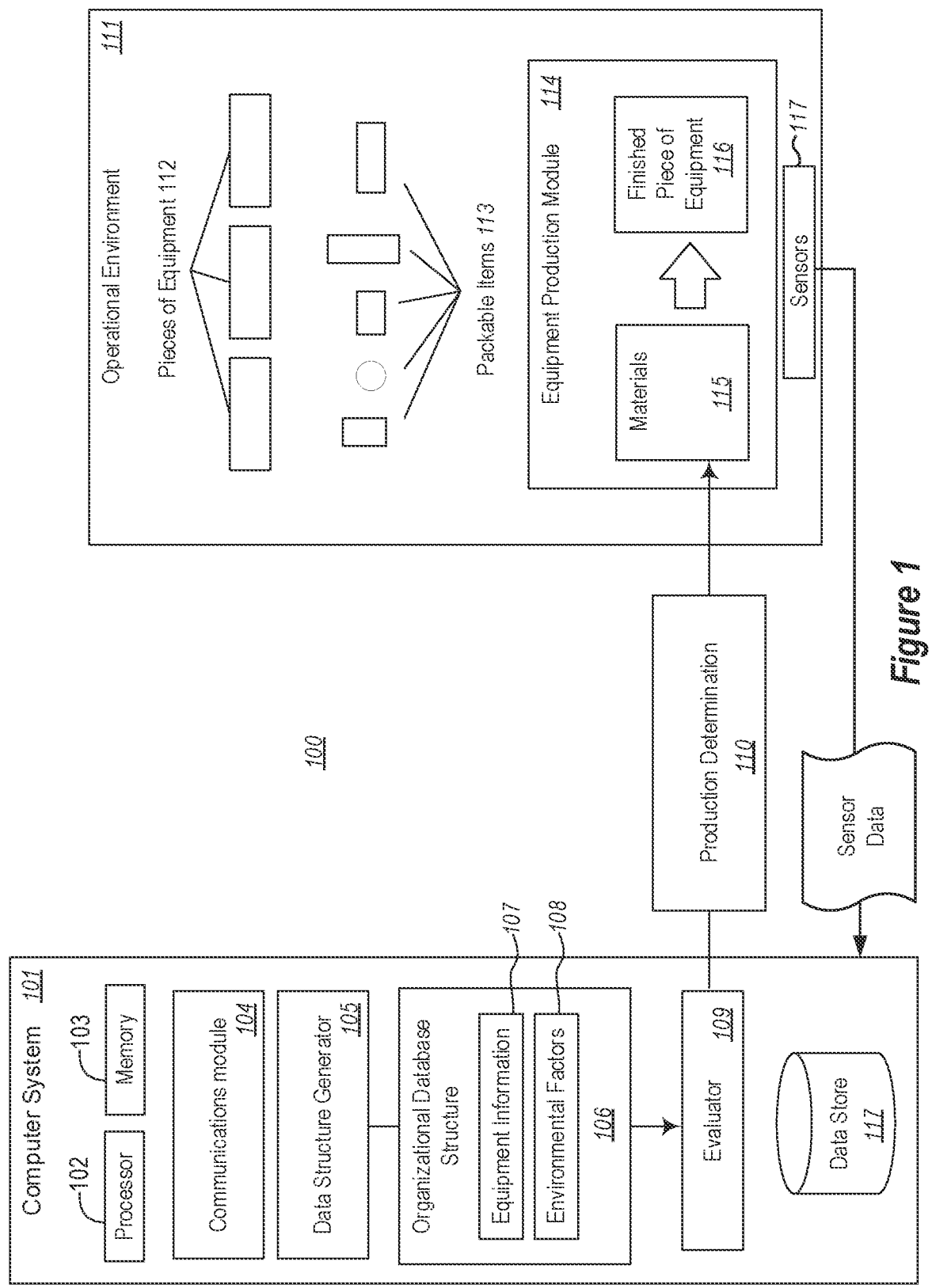
FIG. 1 illustrates a computer architecture in which embodiments described herein may operate including managing and producing equipment within an operational environment.

Embodiments described herein are directed to apparatuses and methods for managing and producing equipment within an operational environment. In one embodiment, a method is performed that includes generating an organizational database structure that maintains information associated with equipment that is part of an operational environment. The organizational database structure includes information indicating which packable items are associated with the piece of equipment. The method further includes accessing the generated organizational database structure to identify physical operational environment factors that affect which pieces of equipment are to be currently produced within the operational environment. The method then evaluates the identified physical operational environment factors to determine whether the specified piece of equipment is to be currently produced within the operational environment and, upon determining that the specified piece of equipment is to be currently processed within the operational environment, the specified piece of equipment is produced and provided to the operational environment.

In another embodiment, an apparatus for producing equipment is provided. The apparatus includes a processor and an induction system configured to determine an order in which pieces of equipment are produced and then produce the pieces of equipment by performing the following: generating an organizational database structure that maintains information indicating which products are associated with a piece of equipment, accessing the generated organizational database structure to identify physical operational environment factors that affect which pieces of equipment are to be currently produced, evaluating the identified physical operational environment factors to determine whether a specified piece of equipment is to be currently produced by the induction system and, based on the evaluation, producing the specified piece of equipment for placement within an operational environment.

The following discussion refers to a number of methods and method acts that may be performed by one or more embodiments of the subject matter disclosed herein. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring to the figures, FIG. 1 illustrates a computer architecture 100 in which at least one embodiment described herein may be employed. The computer architecture 100 includes a computer system 101. The computer system 101 includes at least one processor 102 and at least some system memory 103. The computer system 101 may be any type of local or distributed computer system, including a cloud computer system. The computer system 101 includes modules for performing a variety of different functions. For instance, communications module 104 may be configured to communicate with other computer systems. The communications module 104 may include any wired or wireless communication means that can receive and/or transmit data to or from other computer systems. The communications module 104 may be configured to interact with databases, mobile computing devices (such as mobile phones or tablets), embedded or other types of computer systems.

The computer system 101 further includes a data structure generator 105. The data structure generator 105 may be part of a database or may work in conjunction with a database to create the data structures (e.g. data store 117). The data structures (e.g. 106) may be generated in a manner that is specific to a given operational environment. For instance the organizational database structure 106 may be specific to operational environment 111. The operational environment 111 may include various pieces of equipment 112 including industrial machines, operation workers, electronic and non-electronic devices, automated systems, user-operated systems, raw materials, manufactured materials, and other items. In some cases, the pieces of equipment 112 may be configured to receive packable items 113. For instance, if the operational environment is a fulfillment center, packable items 113 may be placed into containers such as boxes for distribution to customers.

In addition to the packable items 113 and the pieces of equipment 112, the operational environment 111 may also include an equipment production machine 114. The equipment production machine 114 may be configured to take raw or pre-manufactured materials 115 and convert those materials into a piece of finished equipment 116. This finished equipment 116 may be the same as or different than equipment 112. In some embodiments, the equipment production machine 114 may be a box or container producing device. The equipment production machine 114 may receive raw materials and create boxes, or may receive pre-made boxes and fold them, arrange them, order them or otherwise process the boxes to make them available to operation workers or to other machines within the operational environment 111.

The computer system 101 interfaces with the equipment production machine 114 via the communications module 104 (or, in some cases, the computer system 101 is integrated into and is part of the equipment production machine 114). As the two communicate, the computer system 101 receives information 107 about the equipment production machine 114 and/or about other equipment in the operational environment 111. This information may include environment factors 108 including the machine's current operating status, number of items produced in a given time period, maintenance data, materials data, or information regarding the packable items 113 that are currently available or regarding packable items that need to be shipped. The equipment information 107 may also include data on which pieces of equipment 112 are currently available, and which can be produced by the equipment production machine 114.

This equipment information 107 is stored in the organizational database structure 106, along with environment factors 108. The environment factors may be based on or at least influenced by sensor data 118 from one or more sensors 117. These hardware sensors 117 may be placed throughout the operational environment 111, and may relay data pertaining to the current position of packable items or equipment, the current trajectory of the items or equipment (e.g. if being moved), physical characteristics of the items or equipment, etc. These characteristics or locations or trajectories may be measured by visible or invisible light sensors, weight sensors, pressure sensors, temperature sensors, cameras, acoustic sensors, inertial sensors or other types of sensors. Indeed, substantially any type of hardware sensor may be used.

Some sensors, such as piezoelectric sensors, may be placed at certain locations within the operational environment 111, for example, to measure changes in pressure, acceleration, force, strain or temperature. These sensor measurements may be used to identify where a piece of equipment currently is (as evidenced by changes in pressure or weight at a certain point), what trajectory that piece of equipment is following, what the equipment currently looks like or what is currently in the equipment (using side-mounted or top-mounted cameras), which packable items are currently located in each zone, which workers are currently in a given zone (using weight or infrared sensors capable of detecting body heat), or any number of other type of feedback sensor data 118 that would be useful in determining whether to produce and/or release a given piece of equipment.

Hardware radios including Bluetooth radios, radio-frequency identification (RFID), WiFi, Cellular, global positioning system (GPS) or other radios may be used to communicate with radios or transceivers embedded in the pieces of equipment and/or within the packable items 113. The radios may use signals from the embedded radios to determine current location, current trajectory, current contents, or other information about the equipment or its contents. These hardware radios may also be in communication with mobile electronic devices used by workers or used at workstations within the operational environment. Internet of Things (IOT) devices may communicate using such radios, and may be programmed to communicate information about the equipment and conveyable items to a central server and/or the conveyor control system 101. The IOT devices may also communicate with the various hardware sensors. As such, the computer system 101 may receive a variety of inputs from hardware devices, sensors and radios to control production of equipment and to further control where the equipment is going within the operational environment 111.

Once the equipment information 107 and/or the environment factors 108 have been gathered or determined, they may then be evaluated by the evaluator 109 of computer system 101. The evaluator 109 accesses the organizational database structure 106 to determine how the equipment production machine 114 is to be run. For example, based on equipment information 107 and one or more environmental factors 108 affecting the operational environment, the evaluator 109 may determine (in production determination 110) that two large-size boxes and four small-sized boxes are to be produced at the equipment production machine 114 in order to fulfill a current order. The evaluator may take into account which packable items 113 are needed to fulfill the order, where those items are located, how long it will take to physically access the packable items, how many operational workers are currently working, how many boxes are currently being produced or have been produced in the past and are ready for use. Many other types of information may be used in the evaluation, as will be explained further below.

Figure 2:
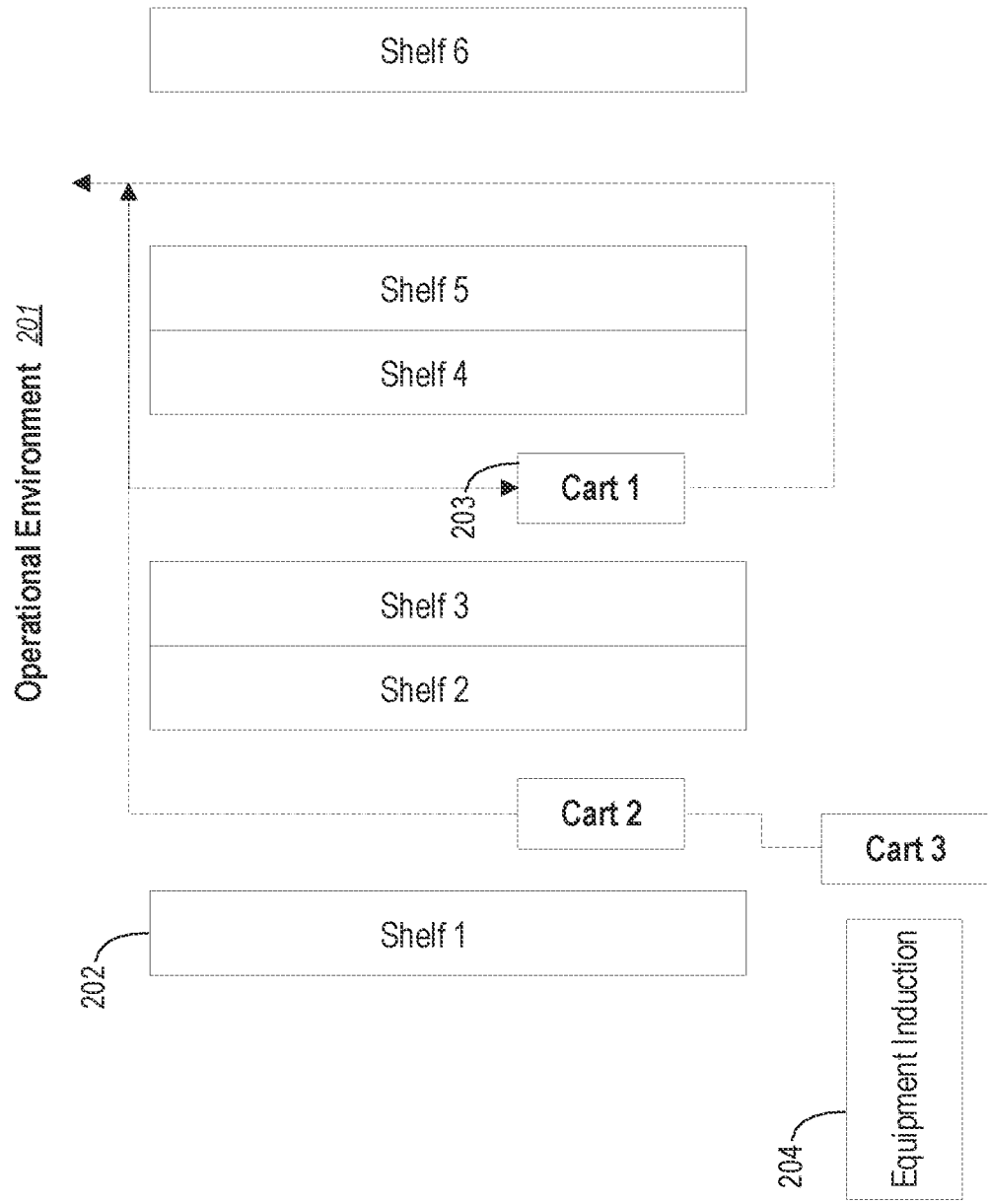
FIG. 2 illustrates an embodiment of an operational environment in which equipment is managed and produced.

In some fulfillment or distribution centers, box orders are packed by operation workers using carts. These carts are filled up with boxes and are pushed through the warehouse where the products are picked from shelves and placed into the boxes. For instance, as shown in FIG. 2, operational environment 201 may include one or more shelves 202. These shelves may allow for the placement of carts 203 in between the shelves. Thus, cart 1 is currently positioned between shelves 3 and 4, while cart 2 is positioned between shelves 1 and 2. It will be understood, of course, that substantially any number of carts or shelves may be used within the operational environment 201. Each shelf may hold a plurality of different packable items (113 from FIG. 1). As the carts are moved to different shelves, operation workers may place the packable items 113 into the boxes for fulfillment.

Figure 3:
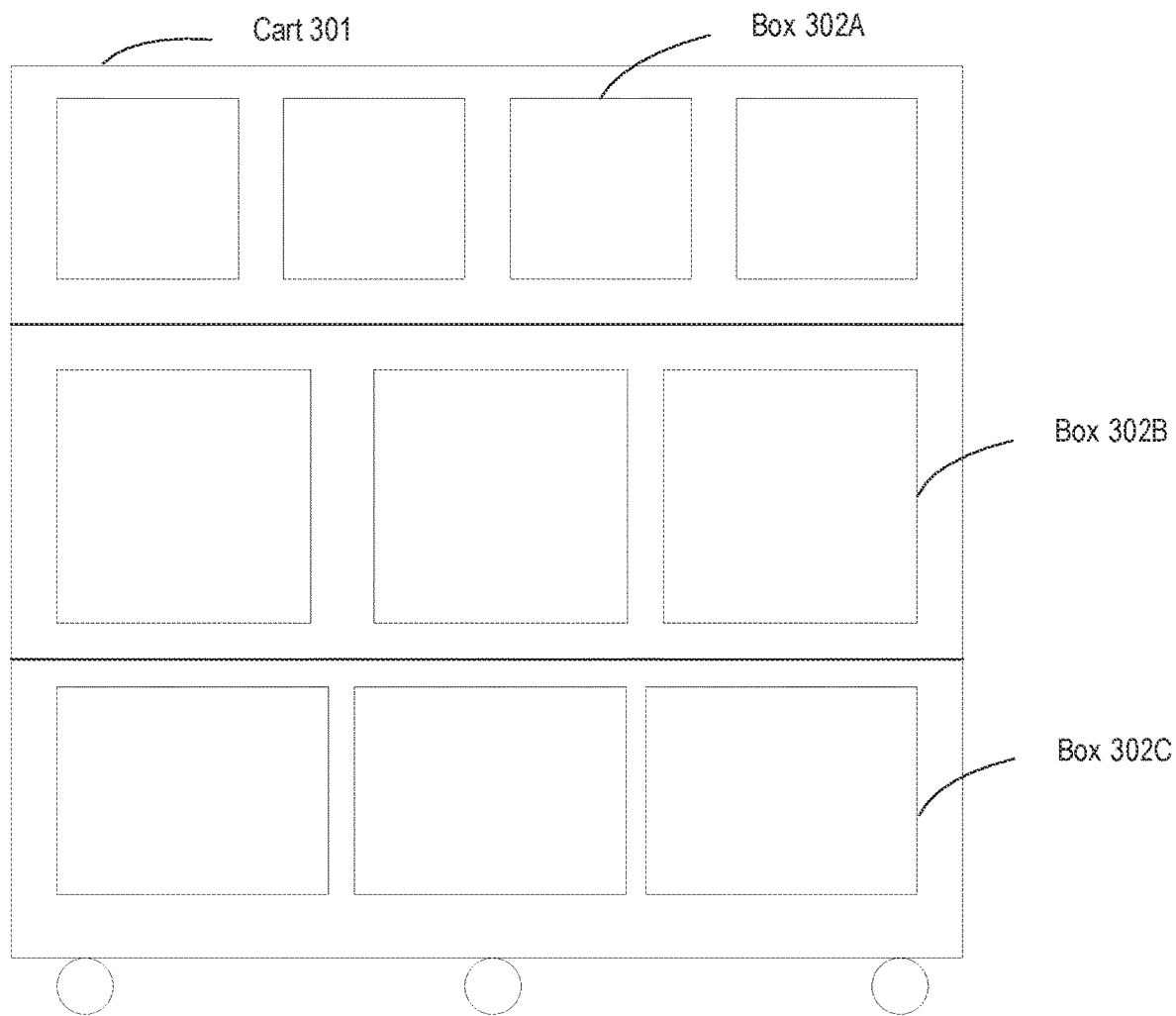
FIG. 3 illustrates an embodiment of a cart with a plurality of boxes within an operational environment.

Thus, as shown in FIG. 3, a cart 301 may have many different boxes, some of which are different sizes. For instance, cart 301 may have smaller boxes such as box 302A, medium size boxes such as 302B, or larger boxes such as 302C. The boxes may be placed onto the carts according to the production determination 110. Then, at the point of equipment induction 204 of FIG. 2, cart 3 may be loaded with a specified set of boxes, as they are produced by the equipment production machine (114 of FIG. 1). The equipment production machine 114 may look at which orders are to be fulfilled and where the packable items 113 are located within the shelves 202, and produce the boxes at the point of equipment induction 204 in a manner that maximizes efficiency within the operational environment 201.

The carts 203 are moved through the shelves until the boxes are filled and the orders are completed. Once the carts are empty of boxes, they are moved back to the induction area 204. At the induction area, empty boxes are placed on each of the slots in the cart. Once the cart is full of empty boxes, it is moved through the aisles in the operational environment in order to pick the packable items 113 from the shelves and place the items in the correct box for order fulfillment. If the cart is filled with boxes after passing only one shelf, it may go straight to the exit and back to the induction area. In some cases, the shelves may be close enough to one another that it is difficult for other carts to overtake each other. This may result in traffic jams and waiting time which leads to a longer order fulfillment time. At least some of the embodiments described herein are designed to minimize such traffic jams and optimize flow through the shelves by controlling the order in which boxes are produced at the point of induction 204.

Accordingly, in one example, box induction is controlled such that a minimum number of carts occupies one aisle at the same time. Furthermore, box induction is controlled such that a shortest length or fastest route is identified through the aisles, based on which packable items 113 need to be placed in each box on the cart. The box induction system (i.e. the equipment production machine 114) may access any or all of the following information in controlling the induction: a number of positions for boxes on each cart, taking box size into account, the positions of each product or packable item (including aisle number and/or bin position if bins are used to store the packable items) that are to be placed into the box, positions of each operational worker that places packable items into boxes, number of carts currently in place in the aisles, positions of each cart within the aisles, current orders that are to be fulfilled, and other information that may be used to make a proper determination of production order.

The equipment production machine 114 may be configured to produce boxes according to box size and quantity restriction of the carts 203. As such, when the cart gets to the induction area 204, the boxes are placed onto the slots of the cart in the order they are produced. In order to reduce walking distance and traffic jams, the equipment production machine 114 may produce boxes for a complete cart for aisle 1 (between shelves 1 and 2 of FIG. 2), and thereafter produce boxes that can be fulfilled in aisle 2, then boxes that can be fulfilled in aisle 3, etc. If a cart cannot be filled with boxes that can be filled with packable items from just one aisle, the equipment production machine 114 would next produce boxes that can be fulfilled in aisles 1 and 2. Next would be boxes that can be fulfilled in aisles 2 and 3, and so on. When an operational worker (either human or automated) is filling a cart walking down aisle 1, an operational worker for a second cart can walk down aisle 2 without any traffic jams. This may, of course, be extended to include more aisle in order to fill up a cart if needed. The equipment production machine 114 continues to induce boxes for the next cart starting with the last aisle for the previous cart if multiple aisles are need in order to fill up the cart.

This optimization may be performed with feedback data from a single cart or from many carts, from a single shelf of packable items or from multiple shelves, and so on. Accordingly, optimizing the order in which boxes are produced by the equipment production machine 114 may be performed with a large amount of feedback data, or with just a small amount of feedback data. Still further, it should be noted, the optimizations described herein may be implemented in an operational environment that has many different sizes of carts, different sizes of shelves or aisles, different packing speeds for operational workers, or other variables that are unique to a given environment. In this manner, orders may be fulfilled in a more efficient manner, saving both time and money in the fulfillment process, increasing the productivity of operational workers, ensuring that orders are fulfilled in a timely manner and preventing wasted trips to shelves that aren't necessary.

Figure 4:
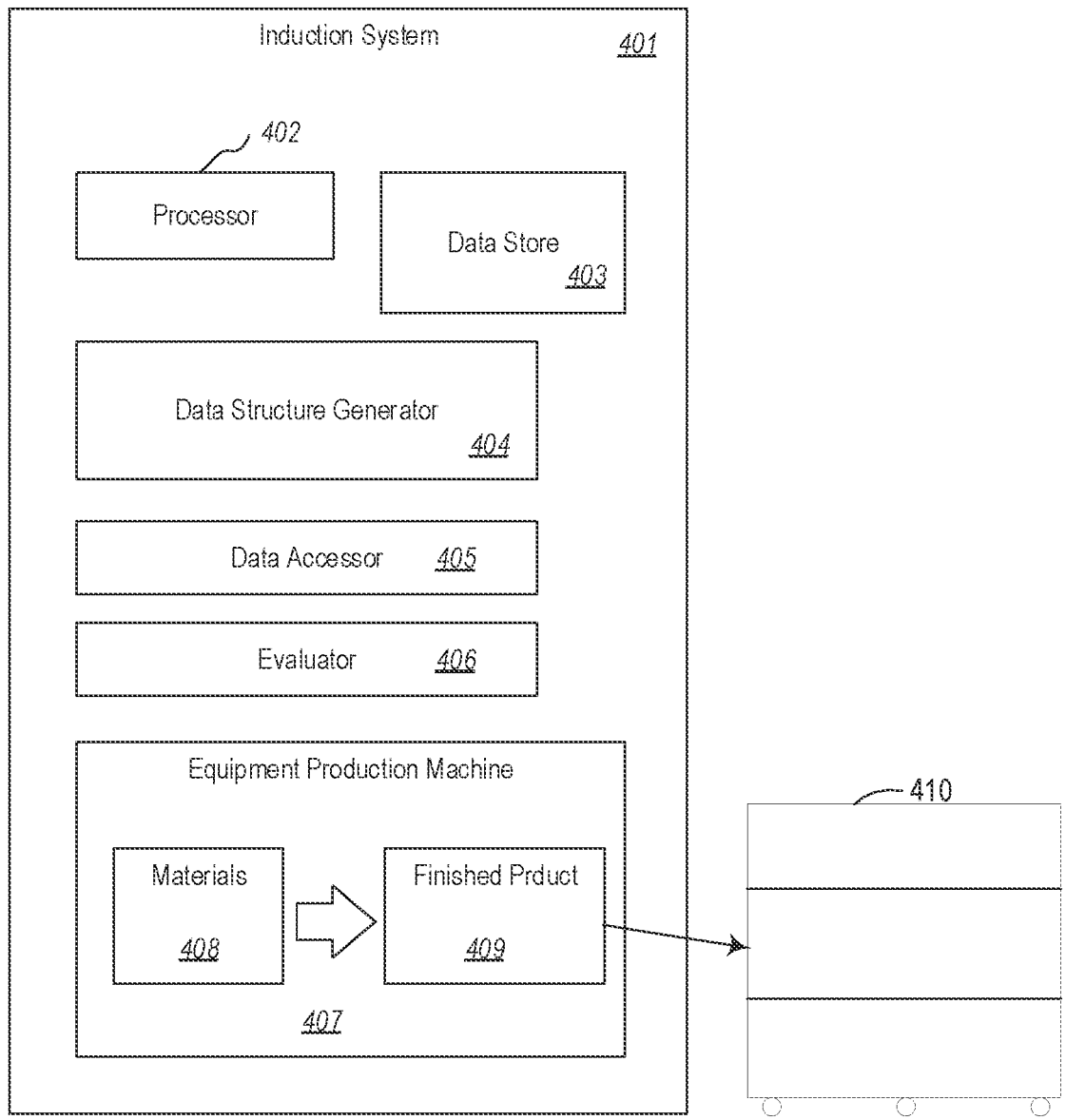
FIG. 4 illustrates an embodiment of an induction system that induces equipment into an operational environment.

FIG. 4 illustrates an embodiment of an apparatus or system that is configured to produce equipment according to a determined production order (e.g. 110 of FIG. 1). The apparatus or includes at least one processor 402, and an induction system 401 configured to determine an order in which pieces of equipment are produced and then produce the pieces of equipment. This is done by performing the following: the data structure generator 404 generating an organizational database structure (e.g. 106 of FIG. 1) that maintains information indicating which products are associated with a piece of equipment. The pieces of equipment 112 may be boxes, containers or other equipment used in fulfilling orders. The organizational database structure 106 may be stored in data store 403, and may include information indicating which packable items 113 are to go in which boxes. The organizational database structure 106 may further include information indicating which shelves hold packable items 113 that are to go in each box, and may also include information indicating which carts are to go down which aisles. All of this information (and perhaps more) may be used in determining which boxes to produce.

The data accessor 405 of the induction system 401 then accesses the generated organizational database structure to identify one or more physical operational environment factors that affect which pieces of equipment are to be currently produced. The physical operational environment factors may include an identified number of fulfillment operators currently working at a specified location in the operational environment, total route distance needed to fulfill an order in a given box or set of boxes in a cart, walking distance for an operator, number of carts ahead of a cart currently being filled with boxes, positions of items in the shelves, or other factors that would affect how a cart filled with boxes is fulfilled using the packable items 113 on the shelves 202.

The evaluator 406 of the induction system 401 then evaluates the identified operational environment factors to determine whether a specified piece of equipment is to be currently produced by the induction system and, based on the evaluation, the equipment production machine 407 produces the specified piece of equipment for placement within an operational environment (e.g. 201). For example, the equipment production machine 407 may take raw or preprocessed materials 408 (e.g. cardboard) and fold, stamp, open or otherwise shape the cardboard into a finished box 409. This box can then be placed on a cart 410. In this manner, by determining which boxes to produce at the equipment production machine 407, and in what order the boxes are produced, the evaluator considers a variety of different factors, each of which may be weighted according to level of importance in providing the most efficient route. For instance, production order may be continually analyzed, and feedback from this analysis may be used to determine whether one factor has more or less influence over efficiency and productivity in box production and fulfillment. If one factor or a group of factors is determined to have more influence on efficiency, that factor will be weighted higher by the evaluator 406 when identifying a production order.

In some embodiments, the apparatus further includes a mechanized sorting arm configured to place pieces of equipment on a routable cart according to a determined placement order. The mechanized arm may receive boxes as they are produced, and may place those boxes on a cart in an automated fashion. The mechanized sorting arm may be operated according to a determined placement order 110 and, as such, the boxes produced by the induction system are supplied to a specific cart in a specific position so that the box will be filled with items from a single shelf, or from shelves that share the same aisle, or from a minimum number of shelves or aisles if needed. Evaluating the physical operational environment factors to determine whether a specified box is to be currently produced by the induction system 401 may include evaluating a timing function that categorizes pieces of equipment according to a number of shelves in the operational environment that are used for fulfillment. Thus, in such embodiments, those boxes that use a large number of shelves for fulfillment are saved until a later time when the operational environment is not as busy or to a more preferred time. These concepts will be explained further below with regard to method 500 of FIG. 5.

Figure 5:
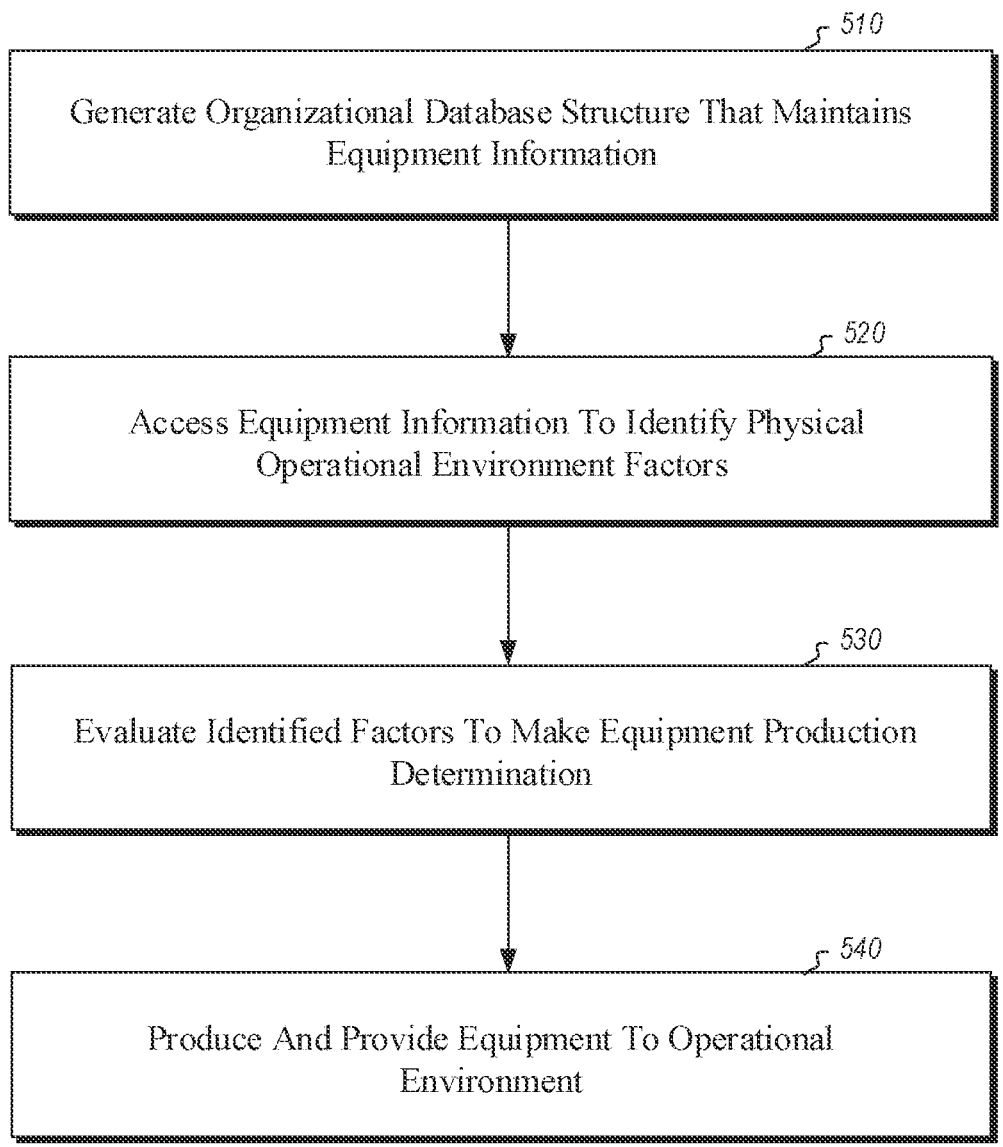
FIG. 5 illustrates a flowchart of a method for managing and producing equipment within an operational environment.

In view of the systems and architectures described above, methodologies that may be implemented in accordance with the disclosed subject matter will be better appreciated with reference to the flow chart of FIG. 5. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a flowchart of a method 500 for managing and producing equipment within an operational environment. The method 500 will now be described with frequent reference to the components and data of environment 100 of FIG. 1.

Method 500 includes generating an organizational database structure that maintains information associated with at least one piece of equipment that is part of an operational environment, the organizational database structure including information indicating which of a plurality of packable items are associated with the piece of equipment (510). For example, data structure generator 105 of computer system 101 may generate organizational database structure 106. This database structure may be stored in data store 117, which itself may be local or remote to computer system 101. The organizational database structure 106 maintains information associated with processes that are ongoing within operational environment 111. Such processes may include inducing boxes into a cart transport system that moves carts among shelves to fill the boxes with packable items that are to be shipped to customers.

The organizational database structure 106 may track which packable items 113 are associated with a given piece of equipment 112. For example, the organizational database structure 106 may store data indicating that box 1 is to have packable items A, B and C. The organizational database structure 106 may also store data indicating that packable items A and B are on shelf 1, and that item C is on shelf 2. Thus, if the shelves are arranged as shown in FIG. 2, then box 1 could be fulfilled in one trip down the aisle between shelves 1 and 2. One organizational database structure 106 may contain data for a plurality of boxes or carts of boxes, or a plurality of organizational database structures may be generated, one for each box and/or cart. In this manner, the data stored in the organizational database structure 106, along with other types of data described above, may be used in the determination of production order.

Next in method 500, the computer system 101 accesses the generated organizational database structure 106 to identify one or more physical operational environment factors 108 that affect which pieces of equipment are to be currently produced within the operational environment (520). These physical operational environmental factors 108 may include cart route distance through the aisles, walking distance between packable items for operational workers, number of carts ahead in line, positions of packable items in the shelves, or other factors. As mentioned above, these factors may be weighted in determining which boxes to produce (e.g. which size and shape) and in which order. The environmental factors may be assessed using sensor data 118 from one or more hardware sensors 117 placed throughout the operational environment 111.

Method 500 further includes evaluating the identified physical operational environment factors 108 to determine whether the specified piece of equipment is to be currently produced within the operational environment (530) and, upon determining that the specified piece of equipment is to be currently processed within the operational environment, producing and providing the specified piece of equipment to the operational environment (540). The evaluator 109 thus accesses the organizational database structure 106, including the equipment information 107 and the environmental factors 108, to determine which boxes are to be produced and at which time (i.e. in production determination 110). The equipment production machine 114 may be configured to produce boxes of many different sizes and shapes. The differently sized and differently shaped boxes may be used to hold different sizes and shapes of packable items 113. Larger boxes may be used to hold multiple items, while smaller boxes may be used for single-item orders.

The evaluator 109 thus determines which boxes are to be produced, and further determines the order to produce them in based on current conditions in the operational environment. These current conditions may be indicated by the environment factors 108. The evaluator may identify which orders are to be fulfilled, where those packable items are located on the shelves of the operational environment (e.g. a fulfillment center or distribution center), which workers are available to help fulfill the order by placing the packable items in the boxes, which boxes are already on a given cart, which aisles the cart will need to go to fulfill the boxes that are on the cart, or the time-sensitive nature of a given order. Many other factors may be considered in determining which boxes to produce and when to produce them and induce them into the operational environment 111. It should be understood that while boxes have been focused on as being the equipment generated by the equipment production machine 114, many other types of equipment may be used, in addition to packaging materials.

In cases where the operational environment is a fulfillment center or distribution center, the operational environment 111 includes shelves with aisles between the shelves, as well as carts that are repositionable within the aisles. The carts are filled with boxes (as shown in FIG. 3), and the boxes are filled with packable items 113 located in bins on the shelves (202 of FIG. 2). Managing the production of equipment includes identifying a route through the fulfillment center that minimizes wait time for fulfillment. As the location of packable items in the fulfillment center is known, the location of each shelf is known, the cart may be arranged with boxes (produced in a specified order) so that the cart only has to go to one shelf, or to two shelves, and so on. The evaluator 109 may receive real-time feedback data indicating the current location of each cart within the operational environment, the location of each worker, the operating condition of each equipment production machine 114, and an indication of which boxes have been put on which carts. Using this real-time feedback data, the evaluator 109 may make an informed decision on which boxes are to be produced by the equipment production machine 114 and in which order.

The real-time feedback data allows the evaluator 109 to produce boxes in such an order that a given cart is loaded with boxes that can be fulfilled within the least number of shelves, or within the shortest route through the shelves, or using a route that avoids cart interference (based on which boxes are on those carts and which aisles they will need to travel to). Thus, the production of boxes can take into account cart routings that avoid bottlenecks in aisles and at stations where packable items 113 are taken from bins and placed into boxes. Identified routes for a given cart may be displayed so that operational workers can view the route that should be taken for that cart. The identified route first loads a specified cart with pieces of equipment that can be fulfilled using only one shelf, and subsequently with pieces of equipment that can be fulfilled using only two shelves. Or, alternatively, the identified route takes into consideration other carts that are already on the floor being fulfilled, or takes into account the timeliness for given orders. For instance, orders that need to go out overnight air would receive higher packing priority.

Thus, many different factors may be considered when determining which boxes to produce and which order to produce them in for optimal fulfillment efficiency. Instructions on producing the boxes or other pieces of equipment are given to the equipment production machine 114, which then physical generates the boxes or other equipment. The boxes may be physically created in real-time, either from cardboard or from other materials. The creation may include folding the boxes, sealing the boxes, labeling the boxes with company logos and/or shipping information, taping ends of the box closed, or other production steps. Thus, inducing a box into the operational environment 111 may include actual physical on-demand creation of the box in the order specified. Custom orders, oddly-shaped boxes, packaging for items that are temperature controlled, containers for animals or plants, as well as other constraints may be taken into account by the evaluator when determining which boxes are to be produced and in which order.

In one specific embodiment, a method is provided, implemented at a computer system (e.g. 101) that includes a processor 102. The method is for producing packaging materials within an operational environment, and includes the following: generating an organizational database structure 106 that maintains equipment information 107 associated with packaging materials that are to be filled with packable items 113. The organizational database structure 106 includes information indicating which of the packable items are associated with the packaging materials. The method next includes loading the generated organizational database structure 106 into memory 103 to identify production factors 108 that affect which packaging materials are to be currently produced by a packaging material production machine 114. As indicated above, these factors may include walking distance, route distance, carts ahead in line, the position of packable items in the various aisles, etc.

Then, using the identified production factors 108, the method includes determining whether the packaging materials 112 are to be currently produced by the packaging material production machine 114 and, upon determining that the packaging materials are to be currently processed by the packaging material production machine, producing the packaging material on the packaging material production machine 114. The packaging materials may include boxes, shipping containers or other equipment that may be produced on-demand by an equipment producing machine. When the packaging materials are produced and induced into the operational environment, a shipping label may be applied to the item, such that upon receiving its corresponding packable items, the box may be sealed and shipped.

It should also be noted that, when determining which boxes are to be produced and in which order, the load capacity of the cart may be taken into account. For example, an operational environment may have many different carts, some of which may have different load capacities. Some carts may be able to hold a large number of boxes, while other carts may only be able to handle a small number of boxes. Similarly, some carts may be able to handle a large amount of weight, while others can handle only a small amount of weight. This information related to characteristics of the carts may be stored in the organizational database structure 106. Accordingly, the evaluator 109 may access the organizational database structure 106 and identify which carts are available and what their carrying capacity is. Then, based on the identified load capacities, the evaluator 109 may determine which packaging materials are to be currently produced by the packaging material production machine 114, and which should be held off for a later time when a larger or smaller cart is available.

Accordingly, methods, systems and computer program products are provided which manage and produce equipment within an operational environment. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A computer system for managing and producing equipment within an operational environment, comprising:
   one or more processors; and
   one or more computer-readable media having stored thereon executable instructions that when executed by the one or more processors configure the computer system to:
      generate an organizational database structure that maintains equipment information associated with at least one container that is part of the operational environment, the organizational database structure including information indicating which of a plurality of packable items are associated with the at least one container;
      access the equipment information of the organizational database structure to identify one or more physical operational environment factors, including at least locations, within the operational environment, of the plurality of packable items that are associated with the at least one container;
      evaluate the locations of the plurality of packable items within the operational environment to determine when to cause a packaging material production machine to produce the at least one container from raw or preprocessed cardboard; and
      upon determining when the at least one container is to be produced within the operational environment:
         identify a predicted dimensional size and weight of the at least one container after it has been loaded with the plurality of packable items; and
         when a routable cart that comprises a load capacity equal to or greater than the predicted dimensional size and the weight is available:
            produce, with the packaging material production machine, the at least one container and a set of subsequent containers in an order in which they are placed on the routable cart, based on a number of positions for containers on the routable cart and taking box size into account, and
            provide the at least one container and a set of subsequent containers to the routable cart in an order that causes a minimum number of routable carts to occupy an aisle at a time.

2. The computer system of claim 1, wherein the at least one container comprises an item of packaging material.

3. The computer system of claim 1, wherein the operational environment includes one or more shelves with aisles between the one or more shelves, and one or more carts that are repositionable within the aisles.

4. The computer system of claim 3, wherein the one or more physical operational environment factors include at least one of route distance, walking distance, number of carts ahead in line, or positions of items in the one or more shelves.

5. The computer system of claim 3, wherein the operational environment comprises a fulfillment center.

6. The computer system of claim 5, wherein managing the at least one container comprises identifying a route through the fulfillment center that minimizes wait time for fulfillment.

7. The computer system of claim 6, wherein the route avoids cart interference and further avoids bottlenecks at picking stations within the fulfillment center.

8. The computer system of claim 7, wherein the route initially loads a specified cart with containers that can be fulfilled using only one shelf, and subsequently with containers that can be fulfilled using only two shelves.

9. The computer system of claim 5, wherein producing the at least one container comprises physical generation of the equipment.

10. The computer system of claim 1, wherein at least one of the one or more physical operational environment factors is based on sensor feedback data from one or more hardware sensors within the operational environment.

11. A computer-readable media comprising one or more non-transitory physical computer-readable storage media having stored thereon computer-executable instructions that, when executed at a processor, cause a computer system to perform a method for managing and producing equipment within an operational environment, the method comprising:
   generating an organizational database structure that maintains equipment information associated with at least one container that is part of the operational environment, the organizational database structure including information indicating which of a plurality of packable items are associated with the at least one container;
   accessing the equipment information of the organizational database structure to identify one or more physical operational environment factors, including at least locations, within the operational environment, of the plurality of packable items that are associated with the at least one container;
   evaluating the locations of the plurality of packable items within the operational environment to determine when to cause a packaging material production machine to produce the at least one container from raw or preprocessed cardboard; and
   upon determining when the at least one container is to be produced within the operational environment:
      identifying a predicted dimensional size and weight of the at least one container after it has been loaded with the plurality of packable items; and
      when a routable cart that comprises a load capacity equal to or greater than the predicted dimensional size and the weight is available:
         producing, with the packaging material production machine, the at least one container and a set of subsequent containers in an order in which they are placed on the routable cart, based on a number of positions for containers on the routable cart and taking box size into account, and
         providing the at least one container and a set of subsequent containers to the routable cart in an order that causes a minimum number of routable carts to occupy an aisle at a time.

12. The method of claim 11, wherein the at least one container comprises an item of packaging material.

13. The method of claim 11, wherein the operational environment includes one or more shelves with aisles between the one or more shelves, and one or more carts that are repositionable within the aisles.

14. The method of claim 13, wherein the one or more physical operational environment factors include at least one of route distance, walking distance, number of carts ahead in line, or positions of items in the one or more shelves.

15. The method of claim 13, wherein the operational environment comprises a fulfillment center.

16. The method of claim 15, wherein managing the at least one container comprises identifying a route through the fulfillment center that minimizes wait time for fulfillment.

17. The method of claim 16, wherein the route avoids cart interference and further avoids bottlenecks at picking stations within the fulfillment center.

18. The method of claim 17, wherein the route initially loads a specified cart with containers that can be fulfilled using only one shelf, and subsequently with containers that can be fulfilled using only two shelves.

19. The method of claim 15, wherein producing the at least one container comprises physical generation of the equipment.

20. The method of claim 11, wherein at least one of the one or more physical operational environment factors is based on sensor feedback data from one or more hardware sensors within the operational environment.

\* \* \* \* \*